United States Patent
Rolla

(10) Patent No.: US 8,795,008 B2
(45) Date of Patent: Aug. 5, 2014

(54) TWO-INTO-TWO OR ONE HYBRID POWER DEVICE FOR A MARINE VEHICLE

(75) Inventor: Philip Rolla, Bruzella (CH)

(73) Assignee: Twin Disc, Inc., Racine, WI (US)

( * ) Notice: Subject to any disclaimer, the term of this patent is extended or adjusted under 35 U.S.C. 154(b) by 288 days.

(21) Appl. No.: 13/081,282

(22) Filed: Apr. 6, 2011

(65) Prior Publication Data

US 2012/0258639 A1   Oct. 11, 2012

(51) Int. Cl.
| | |
|---|---|
| B63H 21/14 | (2006.01) |
| B63H 21/17 | (2006.01) |
| B63H 21/20 | (2006.01) |
| B63H 23/10 | (2006.01) |
| B63H 23/12 | (2006.01) |
| B63H 23/18 | (2006.01) |
| B63H 23/30 | (2006.01) |

(52) U.S. Cl.
USPC ..................................... 440/3; 440/6; 440/75

(58) Field of Classification Search
USPC ..................................... 440/1, 3, 4, 6, 75, 83
See application file for complete search history.

(56) References Cited

U.S. PATENT DOCUMENTS

| | | | |
|---|---|---|---|
| 3,225,732 A | | 12/1965 | Carlsen |
| 3,543,518 A | * | 12/1970 | Fukuo ............................ 290/4 R |
| 4,417,878 A | * | 11/1983 | Koren ............................... 440/3 |
| 5,327,987 A | | 7/1994 | Abdelmalek |
| 5,489,001 A | | 2/1996 | Yang |
| 6,170,587 B1 | | 1/2001 | Bullock |
| 6,464,608 B2 | | 10/2002 | Bowen et al. |
| 6,533,693 B2 | | 3/2003 | Bowen et al. |
| 6,852,055 B2 | | 2/2005 | Kmicikiewicz |
| 7,140,461 B2 | | 11/2006 | Morrow |
| 7,147,523 B2 | * | 12/2006 | Mori et al. ........................ 440/3 |
| 7,241,192 B2 | | 7/2007 | Andersen et al. |
| 7,520,354 B2 | | 4/2009 | Morrow et al. |
| 7,578,363 B2 | | 8/2009 | Kim |
| 2005/0107198 A1 | | 5/2005 | Sowul et al. |
| 2006/0057910 A1 | | 3/2006 | Stallings |
| 2006/0089062 A1 | | 4/2006 | Carr |
| 2007/0034428 A1 | | 2/2007 | Janson |
| 2008/0000312 A1 | | 1/2008 | Lang et al. |
| 2008/0064273 A1 | | 3/2008 | Mizokawa |
| 2008/0076622 A1 | | 3/2008 | Manken et al. |
| 2008/0085814 A1 | | 4/2008 | Yang |
| 2008/0142283 A1 | | 6/2008 | Kluge et al. |
| 2009/0223727 A1 | | 9/2009 | Tolksdorf |
| 2010/0167601 A1 | | 7/2010 | Rzadki et al. |
| 2010/0311291 A1 | | 12/2010 | Rolla et al. |

FOREIGN PATENT DOCUMENTS

| | | | | |
|---|---|---|---|---|
| DE | 10063338 | | 6/2002 | |
| DE | 10111910 | | 9/2002 | |
| JP | 60018495 A | * | 1/1985 | ............. B63H 21/17 |

(Continued)

Primary Examiner — Ajay Vasudeva
(74) Attorney, Agent, or Firm — Boyle Fredrickson S.C.

(57) ABSTRACT

A hybrid power device for a marine vehicle is provided that has two hybrid prime movers, an electric motor and a combustion engine, that distribute power, for example torque, to a single or dual propulsor, such as surface drives with propellers. The prime movers can apply power singly or in unison, but maintain substantially optimum propulsive efficiency in all cases. The power outputs of the prime movers are in communication with a power transmitting device such as a gear box that may combine the power outputs to drive a single propulsor, or may have a power-splitting embodiment driving dual propulsors. In addition, multiple hybrid power devices may be deployed in other embodiments.

18 Claims, 10 Drawing Sheets

(56) References Cited

FOREIGN PATENT DOCUMENTS

| JP | 05139381 | A | * | 6/1993 | ............ | B63H 23/18 |
| JP | 2001270495 | A | * | 10/2001 | ............ | B63H 23/18 |
| WO | 2010022464 | | | 3/2010 | | |

* cited by examiner

TWO-INTO-TWO OR ONE HYBRID POWER DEVICE FOR A MARINE VEHICLE

BACKGROUND OF THE INVENTION

1. Field of the Invention

The present invention relates generally to marine powertrains and more specifically to a device for transmitting power from hybrid prime movers to one or more propulsion devices on a marine vehicle.

2. Discussion of the Related Art

In light of numerous environmental concerns, hybrid electric-combustion vehicles that can be powered with electrical power instead of relying solely on internal combustion engines are being used to reduce pollution, primarily in the form of reduced exhaust emissions and noise, and to improve overall fuel efficiency. As a result, such hybrid vehicles are becoming increasingly popular. To date, the most prevalent commercialized examples of this trend are found in the automobile industry.

Some efforts have been made to utilize electric power and hybrid drive technologies in marine vehicles. However, the most prevalent marine examples have been implemented in custom hybrid electric-combustion systems only in the largest of marine vessels, but none of these marine vehicles incorporate a power device that allows for controlled application of either or both power sources, the electric motor and the combustion engine, while not significantly impacting propulsive efficiency.

Because the current marine powertrains fail to provide a solution to the problems of noise, air pollution, low fuel efficiency, and reliability, a green solution was desired that would create less environmental pollution in the form of decreased noise and exhaust emission, and realize the advantages of a secondary prime mover in terms of speed and stealth while not sacrificing improved propulsive and fuel efficiency. What is needed then is a hybrid power device for a marine vehicle that is flexible and efficient—one that allows the user to rely solely on an electric motor in certain circumstances, solely on a combustion engine in other circumstances, or on both prime movers in other circumstances, while not impacting speed and propulsive efficiency.

SUMMARY OF THE INVENTION

The present invention provides a device for transmitting power from two hybrid power sources to at least one or more propulsion devices such surface propeller drives, conventional propeller installations, water jets, outdrives, pod drives, and the like.

According to one aspect of the invention, a propulsion system for a marine vehicle includes an electric motor having a first power transmitting element in communication with a power transmitting device whereby a first torque is transmitted to a first input of the power transmitting device. In addition, the system includes a combustion engine having a second power transmitting element in communication with the power transmitting device whereby a second torque is transmitted to a second input of the power transmitting device. At least one propulsor having a power input element is also provided, wherein a torque applied to the power input element generates a propulsive force to move the marine craft. The power transmitting device further includes at least one output in communication with the at least one propulsor's power input element, and a power transmitting assembly configured such that 1) when the first torque or the second torque is applied at any given time, there is a substantially corresponding torque of the output in communication with the at least one propulsor's power input element; and 2) when the first torque applied to the first input and the second torque applied to the second input is at substantially the same revolutions per minute, a substantially corresponding revolutions per minute of the output in communication with the at least one propulsor's power input element occurs.

In another aspect of this embodiment, a propulsor thruster configured for optimum efficiency when running at full power with both the first torque applied to the first input and the second torque applied to the second input at substantially the same revolutions per minute.

According to another aspect of this embodiment, an RPM equalizing device configured to control the power transmission from the first power transmitting element of the electric motor and from the second power transmitting element of the combustion engine such that the first input and second input are rotated at substantially the same revolutions per minute.

In a further aspect of this embodiment, an automatic mode selection element is configured to control the application of power from the electric motor and the combustion engine such that either power source can be used independently or in combination.

In yet another aspect of this embodiment, the electric motor is configured to be run over a range of power outputs that includes a power output that causes a revolutions per minute of the first input that is substantially the same revolutions per minute of the second input whereby the electric motor may be a booster.

According to another aspect of this embodiment, the power transmitting device is a gear box further including a gear box housing fixed with respect to a transom of a marine vehicle. The gear box also includes a power transmitting assembly including a gear train mounted within the gear box housing, the gear train accepting power from the first input and the second input and substantially halving the power into the two power transmitting device.

According to another embodiment, a method of propelling a marine vessel includes operating prime movers, wherein one prime mover is an electric motor and one prime mover is a combustion engine. The method further includes accepting power created by either or both prime movers into a gear train housed in a gear box, and outputting the power as either one or two power components. Next, the method includes accepting the one or two power components into corresponding one or two clutch assemblies, and selectively transmitting the one or two power components through the clutch assemblies and to corresponding one or two propulsors operably connected thereto thereby propelling a marine vehicle.

Being able to use an electric motor as a sole prime mover allows boats and other marine vehicles to reduce pollution from exhaust emissions and to reduce noise when at or near marinas, or other mooring locations, as may be required by waterway regulations.

It is further noted that in various jurisdictions, anti-idling rules and regulations are being proposed and implemented for boats and other watercraft. Some jurisdictions are proposing and implementing rules and regulations that prohibit the use of internal combustion engines, or establish maximum horsepower ratings for internal combustion engines, for certain portions of the waterways in these jurisdictions.

In addition marine vehicles, especially those involved in military maneuvers, may need to run as quietly as possible to avoid detection. Being able to power the marine vehicle quietly with just an electric motor in a so-called stealth mode may help avoid detection by enemy forces, thus saving lives and equipment.

Marine vehicles may also be required to operate at lower speeds to avoid generating wakes when traversing a no-wake designated portion of a waterway. Importantly, electric motors are not only quieter and cleaner than combustion engines, but they are more fuel efficient than combustion engines at lower speeds.

Alternatively, being able to use the combustion engine as the sole prime mover allows for the usage of an alternative fuel source and alternative prime mover in the event of the failure of the electric motor or the loss of electric power such as when the batteries are discharged. This redundancy allows the vehicle to be more reliable, and to continue its voyage even after the loss of either prime mover or its associated fuel. In addition, the combustion engine may recharge the discharged batteries by generating electricity when turning the electric motor.

Finally, being able to use both prime movers, the combustion engine and the electric motor, can allow for increased maximum speed, which is especially important for pursuit or evasion for military marine craft, government agency marine vehicles, and the like. In addition, using both prime movers may allow a planing marine craft to overcome a high resistance hump in achieving planing condition, which neither the electric motor nor the combustion engine on its own can overcome.

These, and other aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE PREFERRED EMBODIMENTS

Figure 1:
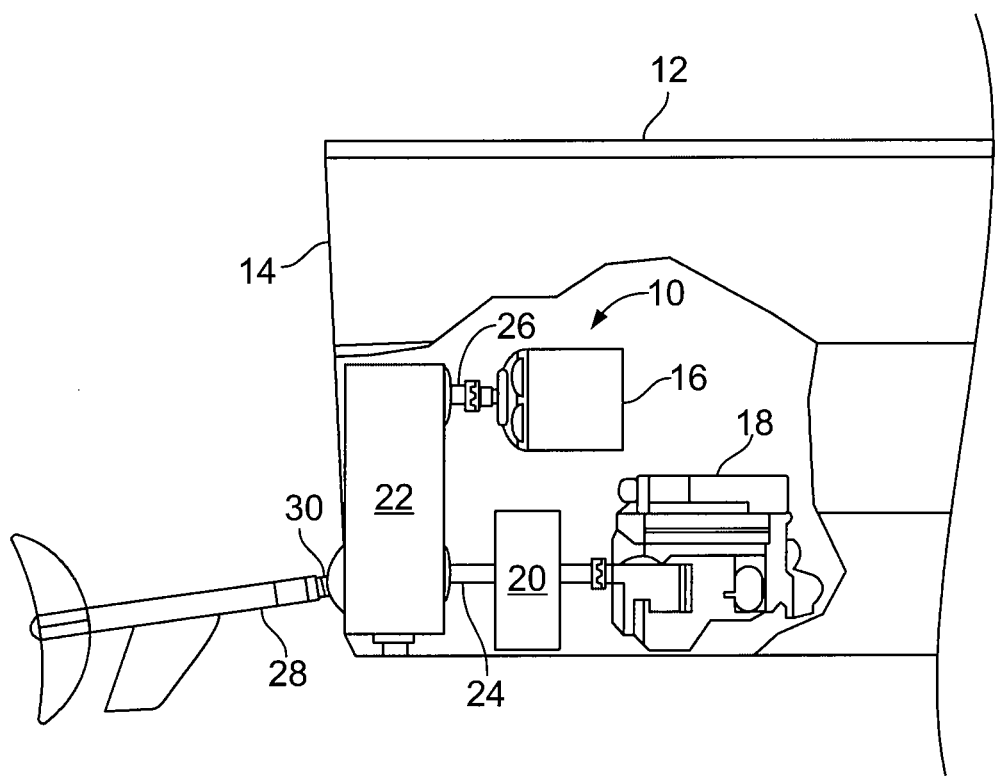
FIG. 1 is a side elevation view with a cutaway section of the aft portion of a marine vehicle showing a hybrid power device in accordance with a preferred embodiment.

With reference now to the drawings, and particularly to FIG. 1, there is shown a cutaway side view of an aft portion of a marine vessel 12 that has a transom 14 and includes the hybrid power device 10 of a preferred embodiment having a single power output 30.

The hybrid power device 10 utilizes two prime movers, an electric motor 16 and a combustion engine 18 that may be a diesel or gasoline powered engine. A transmission 20 is operably connected to prime mover 18, behind or downstream of prime mover 18. Transmission 20 is preferably an MGX-series transmission (QuickShift® transmission) or an MG-series transmission, available from Twin Disc, Inc. headquartered in Racine, Wis. and in one preferred embodiment is a 2-speed transmission.

Prime movers combustion engine 18 and transmission 20 are connected to a gearbox 22, for example by way of a transmission output shaft 24. In addition, prime mover electric motor 16 is connected to gearbox 22, for example by way of a transmission output shaft 26. Power transmitting device, for example gear box 22 converts power that is delivered from prime movers 16, 18 into one or more power components. In this illustrative embodiment there is a single power component output via power output shaft 30 for drive assembly 28. The drive assembly 28 is preferably a marine surface drive, for example an ARNESON™ surface drive available from Twin Disc, Inc., noting that other drives, including submerged-type drives, water jets, and so forth are also contemplated and well within the scope of the invention.

Figure 2:
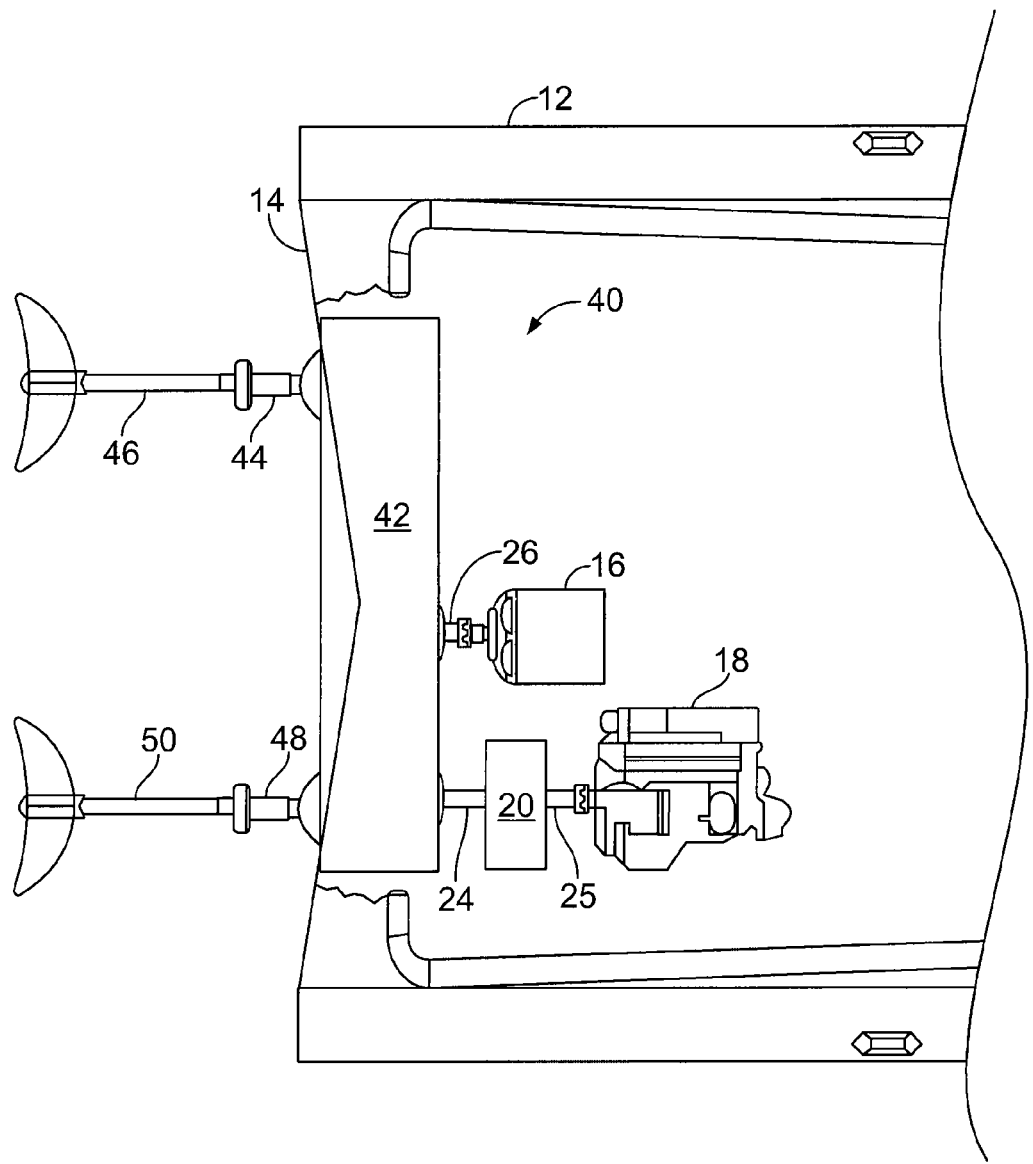
FIG. 2 is a top elevation view with a cutaway section of the aft portion of a marine vehicle showing a hybrid power device in accordance with a preferred embodiment including two propulsors (i.e., surface drives)

Referring now to FIG. 2, there is shown cutaway top view of an aft portion of a marine vessel 12 that has a transom 14 and includes another embodiment of a hybrid power device 40 of the current invention having two power outputs 44, 48.

The hybrid power device 40 utilizes two prime movers, an electric motor 16 and a combustion engine 18 that may be a diesel, a turbine, or gasoline powered engine. A transmission 20 is operably connected to the prime mover 18, behind or downstream of the prime mover 18. Transmission 20 is preferably an MGX-series transmission (QuickShift® transmission) or an MG-series transmission, available from Twin Disc, Inc. headquartered in Racine, Wis. and in one preferred embodiment is a 2-speed transmission.

Prime mover combustion engine 18 is connected to transmission 20 via output 25, and transmission 20 is connected to a power splitting gearbox 42, for example by way of a transmission output shaft 24. In addition, prime mover electric motor 16 is connected to a power splitting gearbox 42, for example by way of an output shaft 26. Power splitting gearbox 42 converts power that is delivered from either or both prime movers 16, 18 into two output power components via power output shaft 44 for drive assembly 46 and power output shaft 48 for drive assembly 50. The drive assemblies 46, 50 are preferably marine surface drives, for example ARNESON™ surface drives available from Twin Disc, Inc., noting that other drives, including submerged-type drives, water jets, and so forth are also contemplated and well within the scope of the invention.

Figure 3:
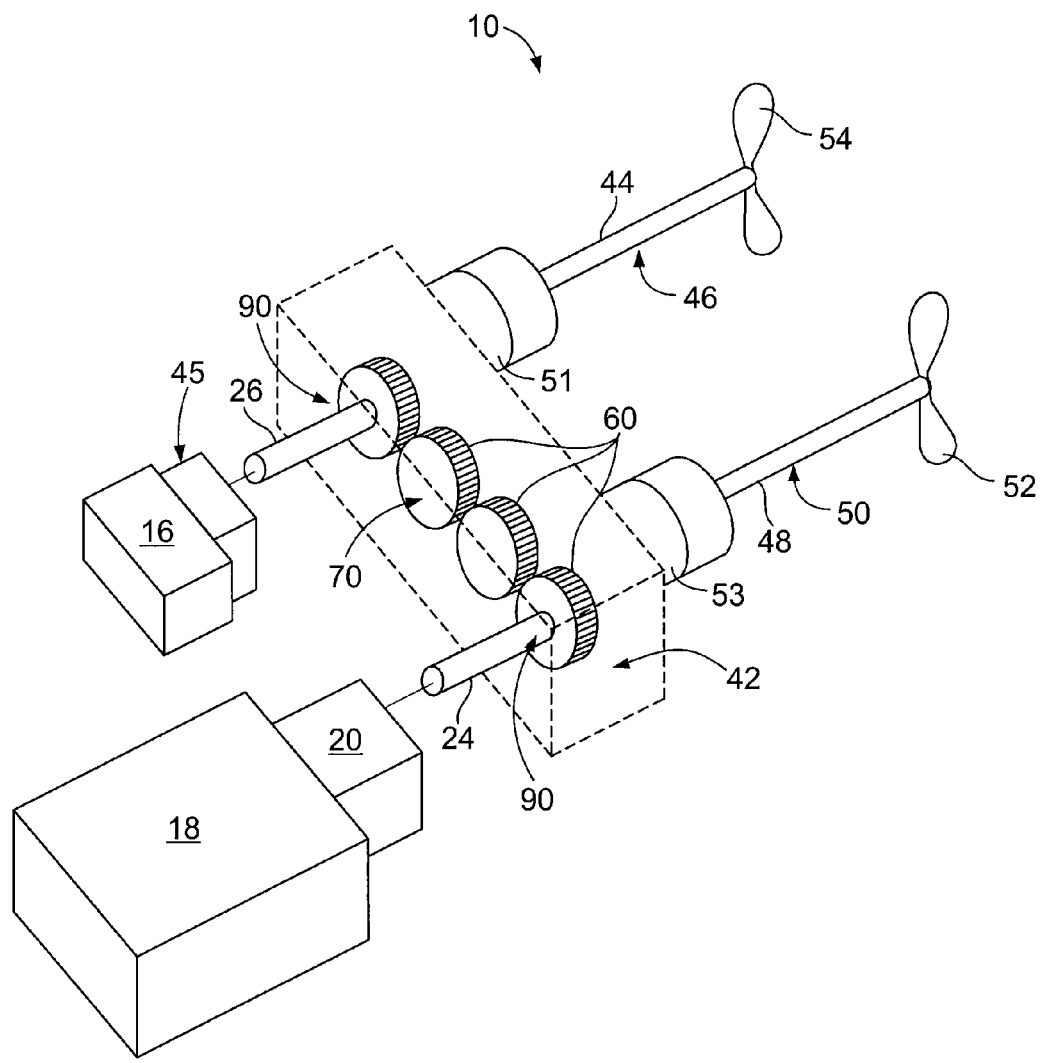
FIG. 3 is an isometric schematic representation of a hybrid power device in accordance with a preferred embodiment including two propulsors (i.e., propellers)

Referring now to FIGS. 2 and 3, hybrid power device 40 with power splitting gearbox 42 provides an interface between the marine vessel 12 and the drive assemblies 46, 50 while inputting power from the prime movers 16, 18 and dividing and distributing the power (or components thereof) to the pair of drive assemblies 46, 50. In this regard, hybrid power device 40 allows a marine vessel 12 with a pair of prime movers 16, 18 to utilize a pair of counter-rotating propellers 52, 54 (FIG. 3).

Still referring to FIGS. 2 and 3, in one embodiment, prime mover 16 may be a two-hundred fifty horsepower electric motor, and prime mover 18 may be a diesel combustion engine with substantially the same horsepower, and the power transmitting device 42 may be a 1-to-1 ratio power splitting gear box such as that disclosed in U.S. Ser. No. 12/478,329, filed on Jun. 4, 2009, and expressly incorporated by reference herein, although other ratios are contemplated, for example, 2-to-1 to accommodate a combustion engine with a high RPM. The electric motor 16 may have its own gear box 45 for reducing the RPMs of its output shaft 26 (as shown in FIG. 3), for example by a 2-to-1 or a 3-to-1 ratio, or it may connect directly to the gear box 42 (as shown in FIG. 2). As well, the combustion engine 18 may have its own gear box 20.

Either or both prime movers 16, 18 can be activated to turn corresponding outputs 26, 24. With either prime mover 16, 18 activated the speed of the marine vehicle may be, for example, thirty-six knots. With both prime movers 16, 18 activated the speed of the marine vehicle may be, for example, fifty knots. With both prime movers activated the electric motor 16 may run as a booster to the combustion engine 18 in which case combustion engine gear box 20 may be a 2-speed gearbox, for example, with 1500 RPM maximum output in one speed in order to accommodate the higher RPM of the combustion engine with respect to the electric motor. Also, with both prime movers 16, 18 activated, the hybrid power device may be designed so that both prime movers contribute substantially equally to the power input to power transmitting gear box 42, or a control system may equalize power inputs into the gear box 42 as described below (similarly, for the power input to power transmitting device 22 in the embodiment of FIG. 1).

Referring more specifically to FIG. 3, either prime mover 16, 18 may transmit its power to drives 46, 50 by mechanically engaging the power transmission path with a clutch, for example, clutches 51, 53 for transmission of torque to drives 46, 50 respectively. Alternatively, one or more clutches may control the transmission of power from the prime mover 16, 18 into the gear box 42 or the gear box 10 (not shown). In addition, each prime mover 16, 18 has a power source: a battery pack for electric motor 16 and a fuel tank for combustion engine 18 (not shown).

Figure 3A:
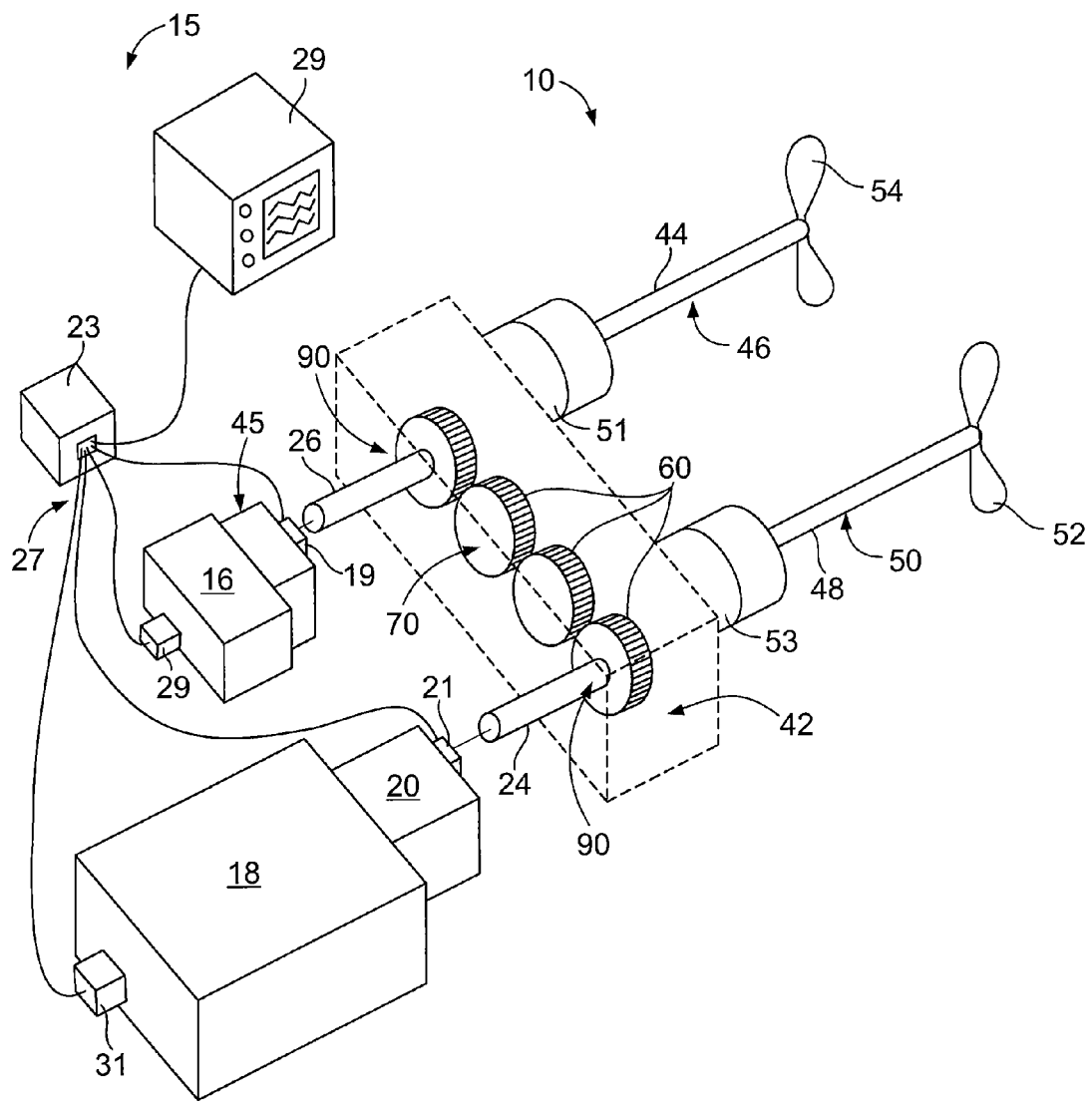
FIG. 3A is an isometric schematic representation of a hybrid power device in accordance with a preferred embodiment including two propulsors (i.e., propellers) and a control system.

Turning now to FIG. 3A, a control system 15, by monitoring various electric motor 16 and combustion engine 18 signals such as output speed, output power, output load, and the like may provide flexible control of hybrid power device 10. The electric motor 16 and combustion engine 18 may be controlled either independently or in combination to achieve a desired result, for example, substantially equal power distribution between prime movers 16, 18, optimal power, speed, and/or fuel efficiency. The control system 15 may monitor and/or control the prime movers 16, 18 with control interface device ECUs (engine control units) 29, 31. Control and status signals may be transmitted and received by the main control unit 23 via wired connections shown as harnessing 27 (alternatively, via wireless connections not shown). The control system 15 may also have user interface 33 that provides control and status for the user which may be separate or integrated with the main control unit 23.

Continuing with FIG. 3A, control system 15 may manage the on-the-fly engagement or disengagement of either prime mover 16, 18 to optimize the desired result using disconnect devices 19, 21, respectively. Either or both of the prime movers 16, 18 may be physically disconnectable from gear box 42 via various means. For example, either or both disconnect devices could be a clutch. Again, control of the power connections to shafts 26, 24 may be desirable to reduce drag, while only using one prime mover, or may aid in the control system's ability to seamlessly manage on-the-fly connections/disconnections of either prime mover. This may allow an emergency "limp-home" mode in the case of a failed prime mover. Also, control system 15 may manage disconnect devices 19, 21 to achieve other desired results; for example, to optimize speed or efficiency, allow for manual control in select situations, and so forth.

Control system 15 may consist of a microprocessor based ECU capable of monitoring various sensors, directly or indirectly with a bus and then communicating with both prime mover ECUs 29, 31 to achieve desired responses, and controlling the disconnect device, are via, for example, associated harnessing 27. Sensors may include speed, temperature, pressure, etc. as required to obtain data to achieve the desired results.

Figure 4:
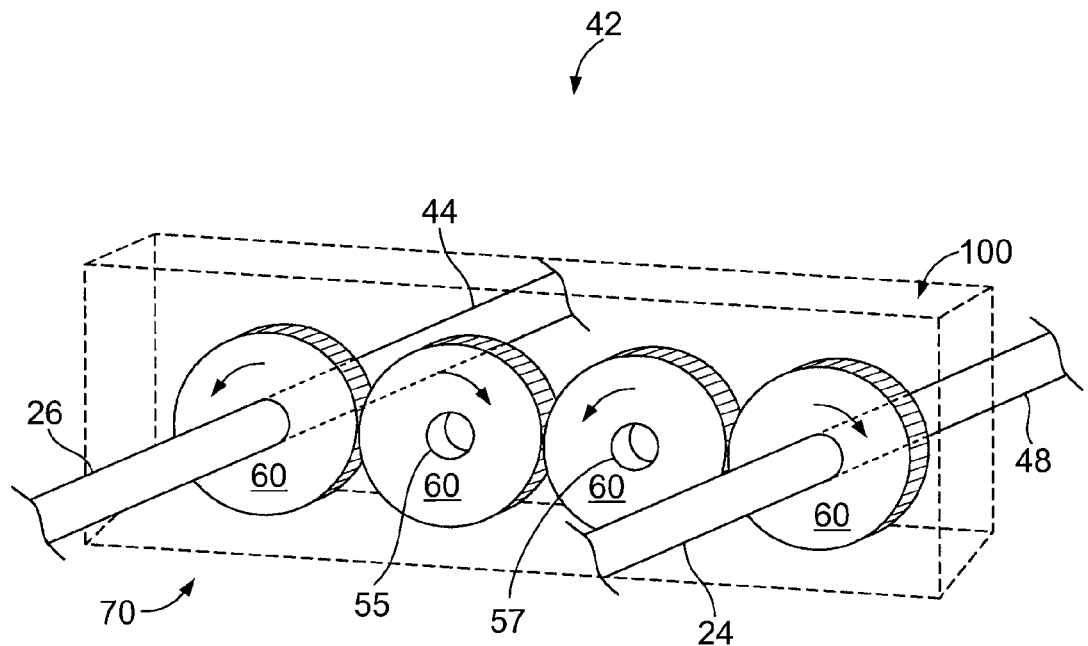
FIG. 4 is a schematic representation of a gear train of the gearbox of the hybrid power device of FIGS. 2 and 3.

Referring now to FIGS. 2-4, power splitting gearbox 42 at least partially contains a gear train 70 or other various components of the power splitting gearbox 42. The gearbox housing 100 may mechanically attach and provide an interfacing structure between the drive assemblies 46, 50 and the transom 14. This is because the gearbox housing 100 may attach to the transom 14, and the final drive assemblies 46, 50 attach to the gearbox housing 100. Since gearbox housing 100 connects the final drive assemblies 46, 50 to the transom 14, it also distributes the application of propulsive forces delivered through the final drive assemblies 46, 50 as well as the weight of the power splitting gearbox 42 and drive assemblies 46, 50 to the transom 14.

Now referring to FIG. 4, but also to FIGS. 2 and 3, gear train 70 mechanically splits power received through inputs 24, 26 for delivery through outputs 44, 48 which may drive a drive assembly 46, 50. Gear train 70 includes multiple gears 60 that intermesh with each other and therefore rotate simultaneously. Gears 60 preferably have helically cut teeth and are radially aligned with each other so that every other gear 60 of gear train 70 rotates in the same direction, while gears 60 that are immediately adjacent each other rotate in opposing directions. Since adjacent, radially engaging gears rotate in opposite directions, intuitively, gears 60 that are spaced from each other by two intermediate gears (or a number of gears that is a multiple of two) will rotate in opposing directions. Correspondingly, the gear train 70 can input power into any one of gears 60 in gear train 70 and achieve counter-rotation of outputs 44, 48, by delivering power through gears 60 that are spaced from each other by two intermediate gears 60 (or a number of gears that is a multiple of two). Thus, contra-rotating outputs could be alternatively connected to the center of gears 55, 57, though not preferred.

It is contemplated that inputs 24, 26 and outputs 44, 48 need not be separate and distinct components, apart from gears 60, but rather can be integrated with individual ones of the gears 60. For example, input 24 can be a splined inner circumferential surface of one of the gears 60 that receives a splined end of output shaft 44. Likewise, outputs 44, 48 can be splined inner circumferential surfaces of ones of the gears 60 that accept and drive splined ends of output shafts 44, 48 connected to drive assemblies 46, 50.

Figure 5:
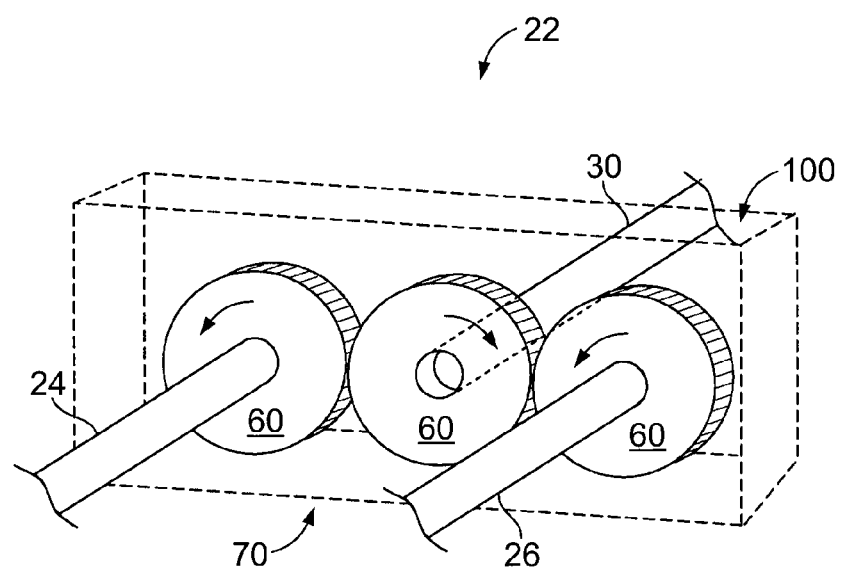
FIG. 5 is a schematic representation of a gear train of the gearbox of the hybrid power device of FIG. 1.

Now referring to FIG. 5, but also to FIG. 1, gear train 70 mechanically transmits power received through inputs 24, 26 for delivery through outputs 30 which may drive a drive assembly 28 (FIG. 1). The gear train 70 includes multiple gears 60 that intermesh with each other and therefore rotate simultaneously. Gears 60 preferably have helically cut teeth and are radially aligned with each other so that every other gear 60 of the gear train 70 rotates in the same direction, while gears 60 that are immediately adjacent each other rotate in opposing directions. Although shown with inputs connected to the outermost gears in FIG. 5, the gear train 70 can input power into any one of the gears 60 in the gear train 70. Similarly, gear train 70 may deliver output from the center gear 70 to output shaft 30 as shown, or any of the other gears.

It is contemplated that inputs 24, 26 and output 30 need not be separate and distinct components, apart from the gears 60, but rather can be integrated with individual ones of the gears 60. For example, input 24 can be a splined inner circumferential surface of one of the gears 60 that receives a splined end of input shaft 24. Likewise, output 30 can be splined inner circumferential surfaces of ones of the gears 60 that accept and drive splined ends of output shafts 30 connected to drive assembly 28.

Figure 6:
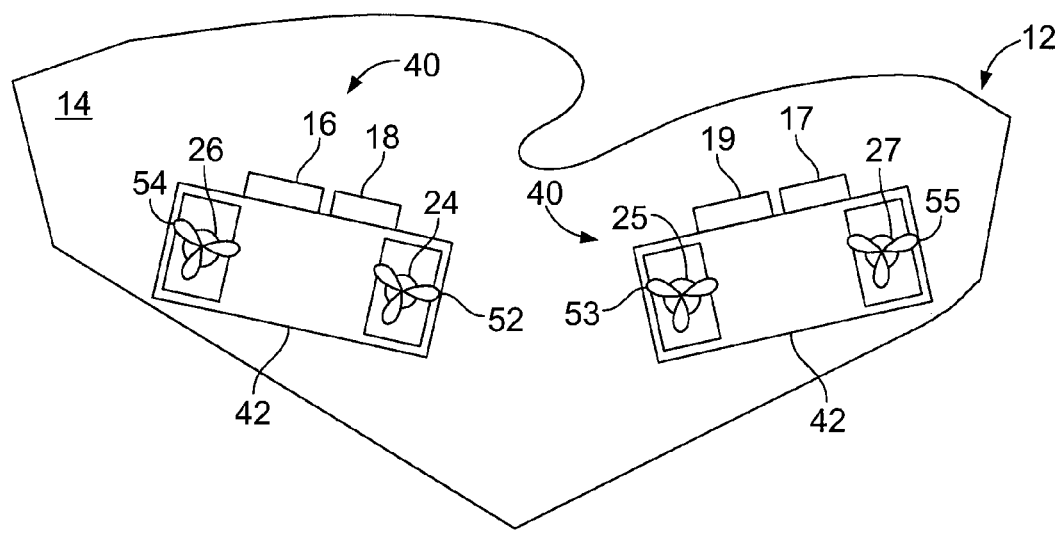
FIG. 6 is a rear elevation, schematic representation of a marine vessel incorporating two hybrid power devices with each gearbox driving two propulsors (i.e., pairs of counter-rotating propellers)

Turning now to FIG. 6, by using a pair of hybrid power devices 40 each having a power splitting gearbox 42, a marine vessel 12 that has two pairs of prime movers 16, 18 and 17, 19 can utilize two pairs of counter-rotating propellers 52, 54 and 53, 55, whereby four total propellers, including a pair of counter-rotating propellers at each of the starboard and port sides of the transom 14, are incorporated into the marine vessel 12.

Figure 7:
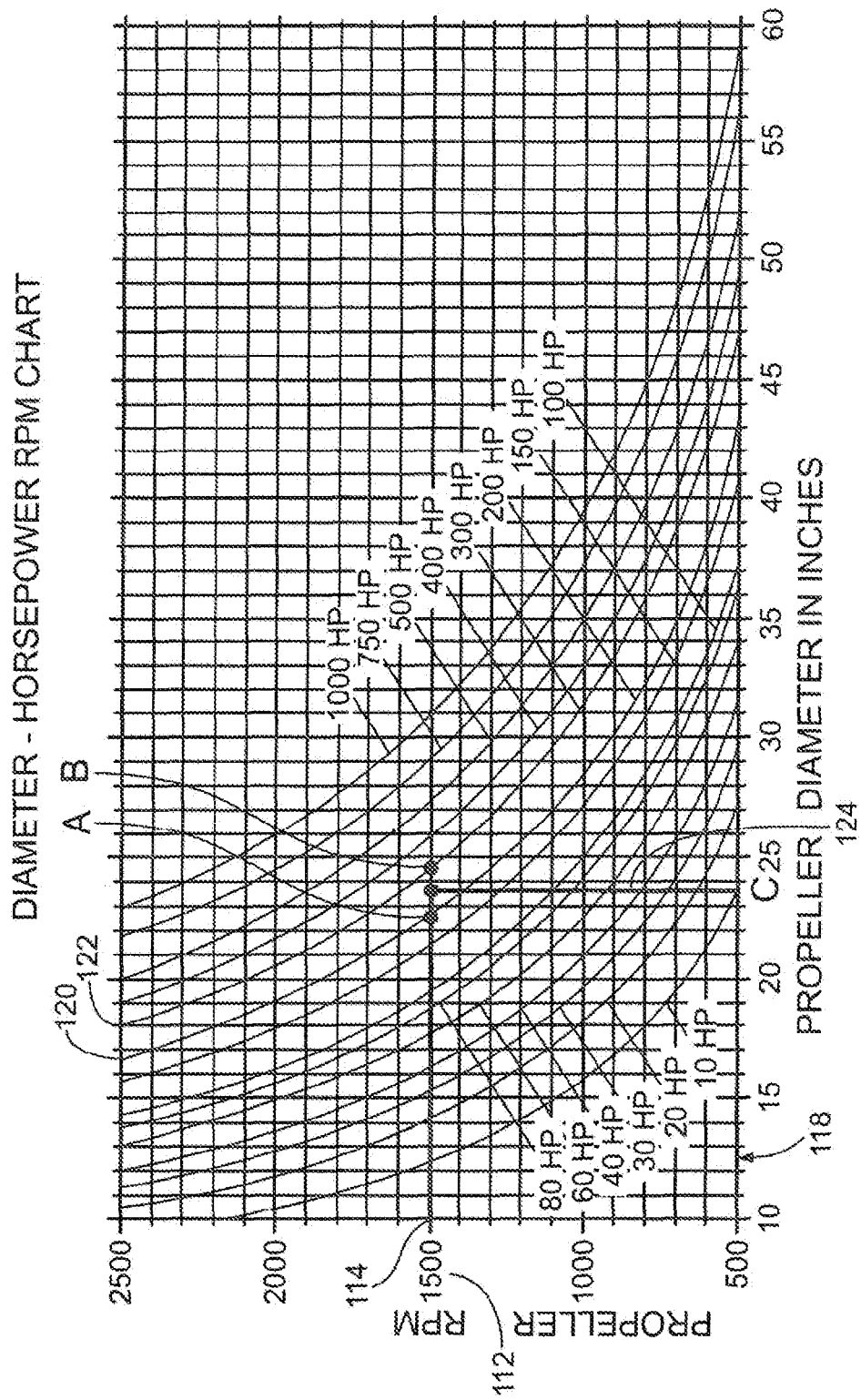
FIG. 7 is a family of plots showing RPM versus propeller blade diameter for several values of motor horsepower as a diameter-horsepower-RPM chart.
Figure 8:
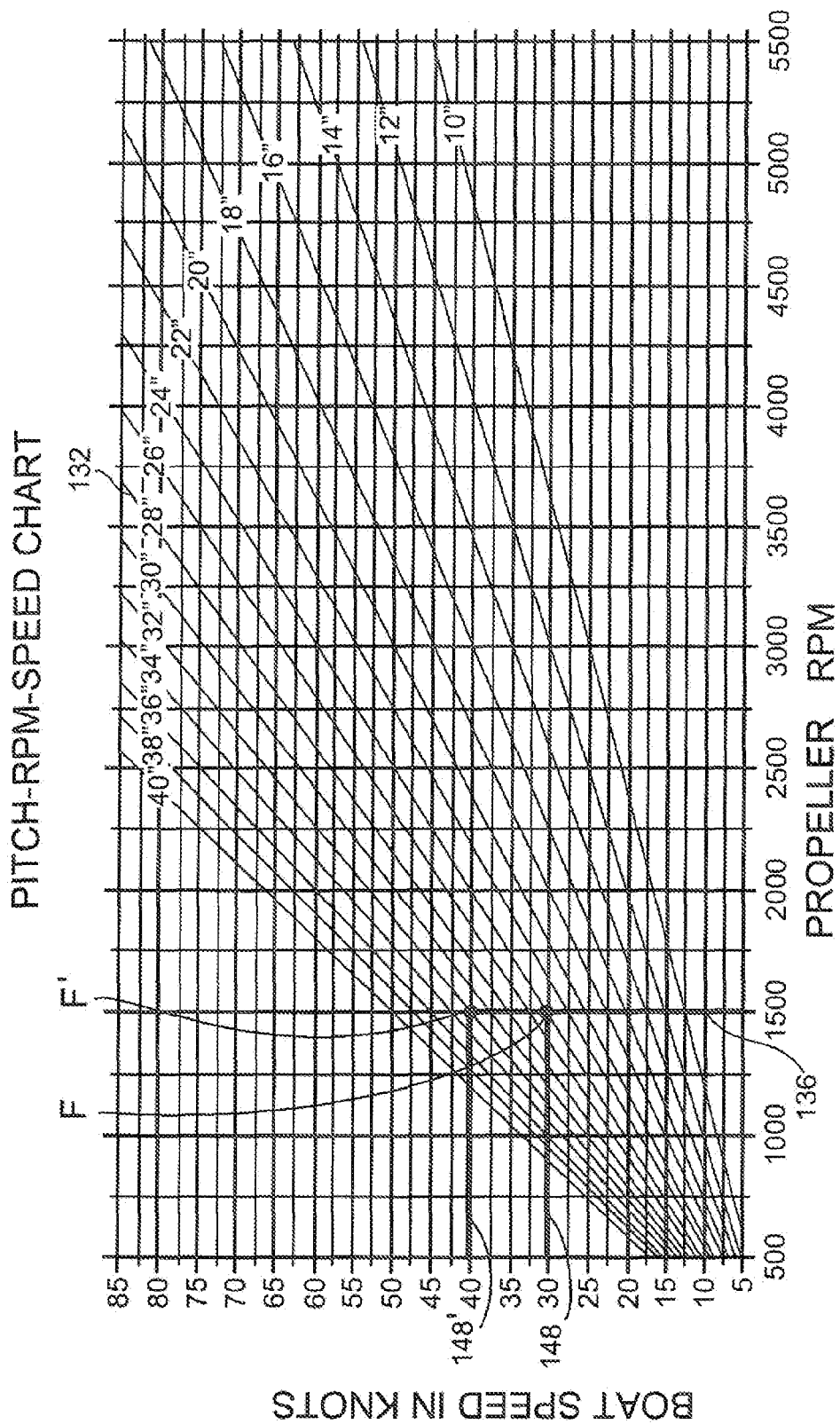
FIG. 8 is a family of plots showing marine craft speed (knots) versus RPM for several values of propeller diameter size as a pitch-RPM-speed chart.

Referring next to FIGS. 7 and 8 and also to FIG. 3, an example demonstrating the dual and single prime mover engagement at two speeds is described showing the correspondence in optimally efficient propulsor geometry. Turning to FIG. 7 in particular, in an embodiment in which a single prime mover 16 or 18 of about 250 HP is engaged and the output of the prime mover is configured to rotate at substantially 1500 RPM, the optimally efficient propeller diameter can be determined utilizing FIG. 7 as follows: 1) locate the 1500 RPM point 112 on the vertical axis and the corresponding 1500 RPM horizontal line 114, 2) locate or approximate the intercept of the horsepower (HP) curve with the 1500 RPM horizontal line 114, and 3) read the propeller diameter in inches from the corresponding intercept on the horizontal axis 118. For example, with the given prime mover of 250 HP, there is no corresponding HP curve, so locate the closest curves that are greater than and less than 250 HP. So, using FIG. 7 locate the 200 HP curve 120 and the 300 HP curve 122. Follow the curves 120, 122 through their intercept points with the 1500 RPM horizontal line 114, points A and B. Because 250 HP is approximately midway, bisect the line between points A and B and draw a vertical line 124 from that point to intercept the horizontal axis 118 at point C. Finally, read the optimum propeller diameter from the horizontal axis point C, which in this case is approximately 23.75 inches. Thus, either 250 HP prime mover running at 1500 RPM is optimized for that rotational speed with a propeller having a diameter of about twenty-four inches.

Referring now more specifically to FIG. 8, determining the speed of the marine vehicle can be performed given the propeller pitch, RPM, and slip. For example, with a twenty-four inch pitch propeller 1) select the corresponding twenty-four inch curve 132, 2) locate the 1500 RPM on the horizontal axis, 3) draw a vertical line 136 through the intercept of the twenty-four inch curve 132 (shown as point F), 4) draw a horizontal line 148 from the intercept F to the vertical axis showing knots, and 5) read the speed of the corresponding craft as thirty knots. As another example, the plot in FIG. 8 shows that with a thirty-two inch pitch propeller 1) select the corresponding thirty-two inch curve 132, 2) locate the 1500 RPM on the horizontal axis, 3) draw a vertical line 136 through the intercept of the thirty-two inch curve 132 (shown as point F'), 4) draw a horizontal line 148' from the intercept F' to the vertical axis showing knots, and 5) read the speed of the corresponding craft as forty knots, which with a 10% slip becomes thirty-six knots.

Figure 9:
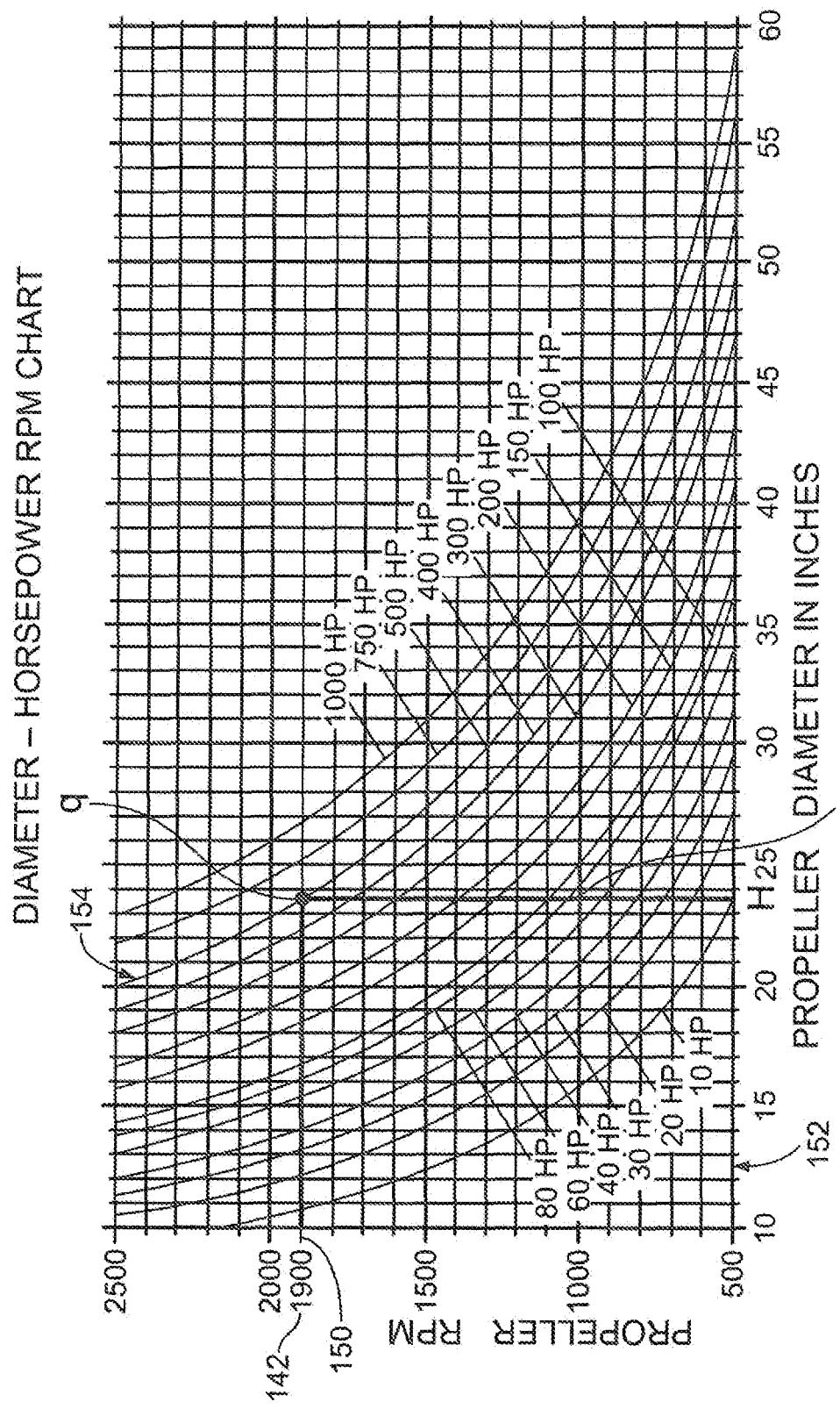
FIG. 9 is a variant of the chart shown in FIG. 7.
Figure 10:
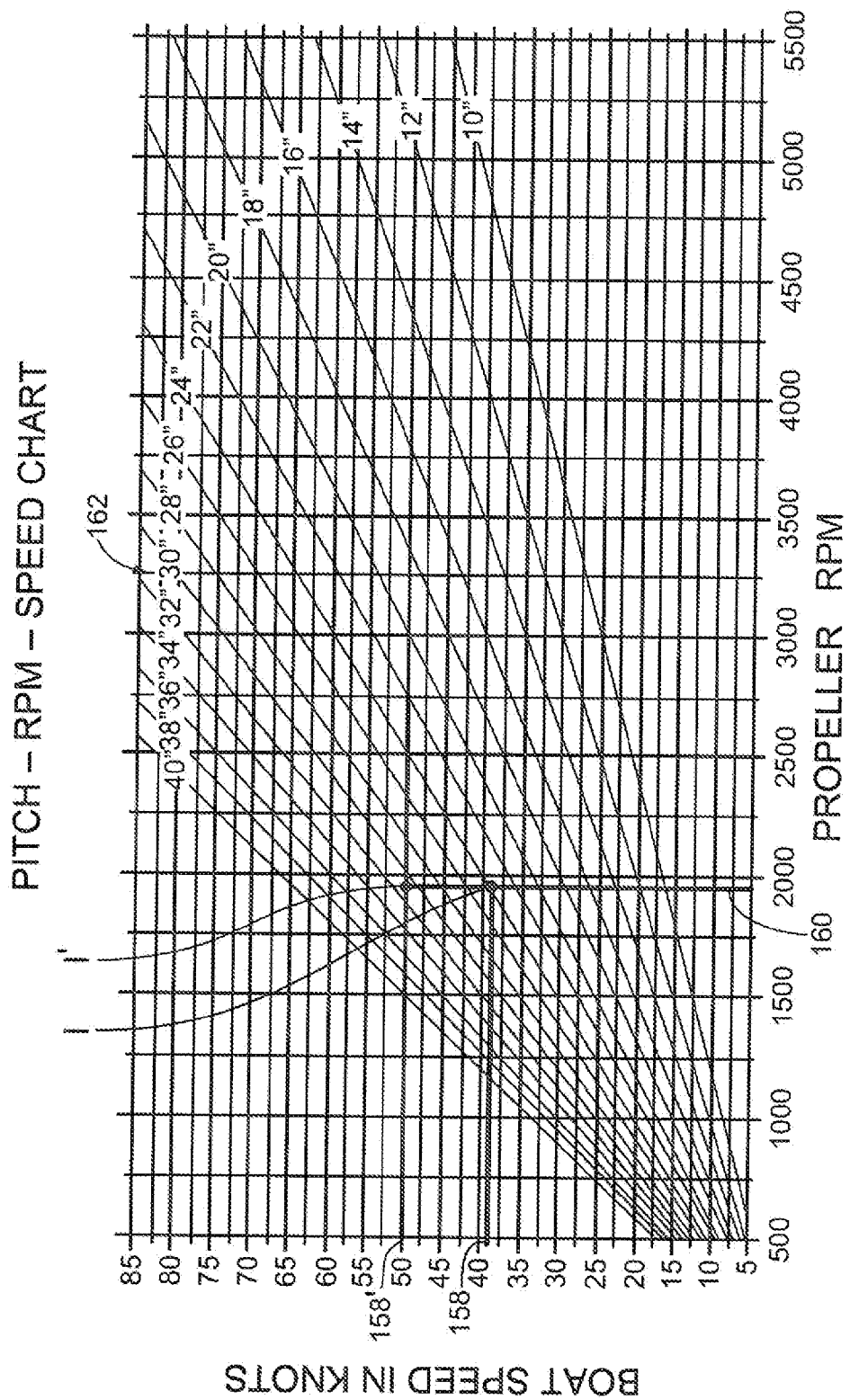
FIG. 10 is a variant of the chart shown in FIG. 8.

Similarly, when running the vessel with both prime movers 16, 18 engaged the power amounts to substantially 500 HP. Referring now to FIG. 9, the propulsor blade has a vertical line 156 indicating its diameter of twenty-three and one-half inches at point H on the horizontal axis 152. The intercept of the 500 HP curve 154 with the diameter is at point q. Drawing a horizontal line 150 from point q to the vertical axis 142 indicates that the propulsor blade pitch of twenty-three and one-half inches or about twenty-four inches with 500 HP will yield about 1900 RPM. Referring now to FIG. 10 to compute speed, 1900 RPM is located on the horizontal axis and a vertical line 160 is drawn to intercept with the twenty-four inch pitch curve 162 at point I. Speed is determined by drawing a horizontal line 158 from the intercept to the vertical axis and determining the speed in knots of about 38. The propulsor blade pitch of twenty-four inches provides for 250 hp and 500 hp operation at speeds of about 30 and 38 knots respectively (corresponding to 1500 and 1900 RPM). As another example, the plot in FIG. 10 shows that a propeller with a thirty-two inch pitch at 1900 RPM, the vertical line 160 intercepts with the thirty-two inch pitch curve 162 at point I'. Speed is determined by drawing a horizontal line 158 from the intercept to the vertical axis and determining the speed in knots of about 50 with 2% slip.

Referring again to FIG. 3, in another embodiment wherein both prime movers 16, 18 contribute substantially equally, the combustion engine 18 and electric motor 16 may be geared to rotate, for example, at 1500 RPM into gear box 42. Propulsive efficiency to achieve fifty knots for a ten ton marine vehicle would be substantially 0.69 when driving propellers 52, 54, which would require that propellers be sized at about 23.5 inches by thirty-two inches. Importantly, the same propeller sizing is optimally efficient with either prime mover engaged at a full speed of thirty-six knots for example. More importantly, by providing substantially equivalent power from prime movers 16, 18 there is a optimum propulsor output sizing (for either propellers or water jets) that is the same for maximum single prime mover speed and maximum dual prime mover speed.

Still referring to FIG. 3, note that the combustion engine prime mover 18 may have a gearbox having a low and high gear 20, whereas the electric prime mover 16 may have no gearbox due to its substantially flat power curve. In one embodiment, the combustion engine 18 may be providing an output of about 1500 RPM into gear box 20 having a gear ratio of 1:1.25 that increases the RPMs of the gearbox output 24 to about 1500 RPM. This may yield a speed of thirty-six knots with either and only one of the two prime movers 16, 18 engaged. The 23.524×32 inch propeller sizing (i.e., a 23.524 inch diameter blade with a 32 inch pitch) remains optimum with a 0.69 efficiency.

The 23.5×32 sizing works out to a 2% slip at fifty knots and 10% slip at thirty-six knots. This 12% slip difference is in keeping with propulsion norms for both surface and submerged propellers, lower speed, higher slip. The fact that the propeller efficiency is 0.69 in both cases comes from proprietary tunnel test data for surface propellers.

The power device 10 need not be limited to the embodiments described above, but may include other embodiments. The scope of some of these changes is discussed above. The scope of others will become apparent from the appended claims.

Regardless, it is noted that many changes and modifications may be made to the present invention without departing from the spirit thereof. The scope of some of these changes is discussed above. The scope of others will become apparent from the appended statements of invention.

What is claimed is:

1. A propulsion system for a marine vehicle comprising:
   an electric motor having a first power transmitting element in communication with a power transmitting device whereby a first torque is transmitted to a first input of the power transmitting device;
   a combustion engine having a second power transmitting element in communication with the power transmitting device whereby a second torque is transmitted to a second input of the power transmitting device, wherein a transmission is arranged between the combustion engine and the power transmitting device;
   at least one propulsor having a power input element wherein a torque applied to the power input element generates a propulsive force to move the marine craft;
   the power transmitting device further comprising at least one output in communication with the at least one propulsor's power input element, and a power transmitting assembly configured such that:
   1) when the first torque or the second torque is applied at any given time, there is a substantially corresponding torque of the output in communication with the at least one propulsor's power input element; and
   2) when the first torque applied to the first input and the second torque applied to the second input is at substantially the same revolutions per minute, a substantially corresponding revolutions per minute of the output in communication with the at least one propulsor's power input element occurs.

2. The propulsion system of claim 1, wherein the at least one propulsor is a single propulsor and the at least one power transmitting device has a single output.

3. The propulsion system of claim 1, further comprising a propulsor thruster configured for optimum efficiency when running at full power with both the first torque applied to the first input and the second torque applied to the second input at substantially the same revolutions per minute.

4. The propulsion system of claim 3, further comprising a propulsor thruster wherein the thruster is configured for optimum efficiency when running at half power with independent torque applied to the first input or the second input.

5. The propulsion system of claim 1, further comprising an RPM equalizing device configured to control the power transmission from the first power transmitting element of the electric motor and from the second power transmitting element of the combustion engine such that the first input and second input are rotated at substantially the same revolutions per minute.

6. The propulsion system of claim 1, further comprising a user controlled speed adjustment element configured to control the speed of the marine vehicle.

7. The propulsion system of claim 1, wherein the combustion engine is configured to be run over a range of power outputs that includes a power output that causes revolutions per minute of the second input that is faster than the electric motor whereby the combustion engine is a booster.

8. The propulsion system of claim 1, wherein the electric motor is configured to be run over a range of power outputs that includes a power output that causes a revolutions per minute of the first input that is faster than the revolutions per minute of the second input whereby the electric motor may be a booster.

9. The propulsion system of claim 1, wherein the second power transmitting element of the combustion engine comprises a rotatable shaft and a gearbox that reduces the rotational velocity of the second input.

10. The propulsion system of claim 1, wherein one or more propulsors are selected from a group consisting of surface propeller drives, conventional propeller installations, water jets, outdrives and pod drives.

11. The propulsion system of claim 1, wherein the power transmitting device is a gear box with the power transmitting assembly comprising gears.

12. The propulsion system of claim 1, further comprising at least one clutch wherein the application of the electric motor's torque is controlled by the clutch and application of the combustion engine's torque is controlled by the clutch.

13. A propulsion system for a marine vehicle comprising:
   an electric motor having a first power transmitting element in communication with a power transmitting device whereby a first torque is transmitted to a first input of the power transmitting device;
   a combustion engine having a second power transmitting element in communication with the power transmitting device whereby a second torque is transmitted to a second input of the power transmitting device;
   at least one propulsor having a power input element wherein a torque to the power input element generates a propulsive force to move the marine craft;
   the power transmitting device further comprising at least one output in communication with the at least one propulsor's power input element, and a power transmitting assembly configured such that:
   1) when the first torque or the second torque is applied at any given time, there is a substantially corresponding toque of the output in communication with the at least one propulsor's power input element; and
   2) when the first torque applied to the first input and the second torque applied to the second input is at substantially the same revolutions per minute, a substantially corresponding revolutions per minute of the output in communication with the at least one propulsor's power input element occurs,
   wherein the at least one propulsor includes two propulsors and the at least one power transmitting device has two outputs.

14. The propulsion system of claim 13, wherein the power transmitting device is a gear box further comprising:
   a gear box housing fixed with respect to a transom of a marine vehicle; and
   a power transmitting assembly comprising a gear train mounted within the gear box housing, the gear train accepting power from the first input and the second input and substantially halving the power into the two propulsors.

15. The propulsion system of claim 14, wherein the gear train includes at least four gears that are substantially radially aligned with each other and intermesh at respective outer circumferential surfaces thereof, such that at least a first pair of the at least four gears rotate in a first direction, and at least a second pair of the at least four gears rotate in a second, opposite, direction.

16. The propulsion system of claim 13, wherein the at least one propulsor includes a first propulsor and a second propulsor, the first propulsor driven by a gear from the first pair of the at least four gears, and the second propulsor is driven by a gear from the second pair of the at least four gears, such that two power transmitting device outputs rotate in opposing directions.

17. A propulsion system for a marine vehicle comprising:
an electric motor having a first power transmitting element in communication with a power transmitting device whereby a first torque is transmitted to a first input of the power transmitting device;
a combustion engine having a second power transmitting element in communication with transmitting device whereby a second torque is transmitted to a second input of the power transmitting device;
least one propulsor having a power input element wherein a torque applied to the power input element generates a propulsive force to move the marine craft;
the power transmitting device further comprising at least one output in communication with the at least one propulsor's power input element, and a power transmitting assembly configured such that:
1) when the first torque or the second torque is applied at any given time there is a substantially corresponding torque of the output in communication with the at least one propulsor's power input element; and
2) when the first torque applied to the first input and the second torque applied to the second input is at substantially the same revolutions per minute a substantially corresponding revolutions per minute of the output in communication with the at least one propulsor's power input element occurs, and
further comprising an automatic mode selection element configured to control the application of power from the electric motor and the combustion engine such that either power source can be used independently or in combination.

18. A method of propelling a marine vessel comprising:
providing an electric motor having a first power transmitting element in communication with a power transmitting device;
transmitting a first torque to a first input of the power transmitting device;
providing a combustion engine having a second power transmitting element in communication with the power transmitting device, wherein a transmission is arranged between the combustion engine and the power transmitting device;
transmitting a second torque is to a second input of the power transmitting device;
providing at least one propulsor having a power input element responsive to torque applied thereto to move the marine craft, wherein the power transmitting device further includes at least one output in communication with the at least one propulsor's power input element, and wherein when the first torque or the second torque is applied at any given time, there is a substantially corresponding torque of the output in communication with the at least one propulsor's power input element; and
causing a substantially corresponding revolutions per minute of the output in communication with the at least one propulsor's power input element when the first torque applied to the first input and the second torque applied to the second input is at substantially the same revolutions per minute.

\* \* \* \* \*